United States Patent [19]
Ono et al.

[11] Patent Number: 5,617,391
[45] Date of Patent: Apr. 1, 1997

[54] OPTICAL RECORDING AND REPRODUCING SYSTEM

[75] Inventors: Seiji Ono, Yokosuka; Kenmei Masuda, Yokohama; Katsuo Konishi, Yokohama; Hiroyuki Nagatomo, Yokohama, all of Japan

[73] Assignee: Hitachi, Ltd., Tokyo, Japan

[21] Appl. No.: 378,193

[22] Filed: Jan. 25, 1995

[30] Foreign Application Priority Data

Feb. 3, 1994 [JP] Japan .................................. 6-011564

[51] Int. Cl.$^6$ ........................................................ G11B 7/00
[52] U.S. Cl. ................... 369/48; 369/54; 369/97; 360/69
[58] Field of Search ............................ 369/48, 47, 49, 369/50, 54, 58, 53, 44.18, 93, 96, 97; 360/77.14, 69, 75

[56] References Cited

U.S. PATENT DOCUMENTS

| 5,095,394 | 3/1992 | Yanagihara | 360/77.14 |
| 5,280,399 | 1/1994 | Owada | 360/77.14 |
| 5,398,140 | 3/1995 | Rhodes et al. | 360/77.14 X |

FOREIGN PATENT DOCUMENTS

| 62-287428 | 12/1987 | Japan . |
| 63-53726 | 3/1988 | Japan . |
| 1-285024 | 11/1989 | Japan . |

OTHER PUBLICATIONS

Maeda, Yasuaki. "Newly Developed Technologies for Audio Equipments," Association of Japan Television Engineering, vol. 47, 1993, pp. 841–844. (provided in Japanese).

*Primary Examiner*—Muhammad N. Edun
*Attorney, Agent, or Firm*—Fay, Sharpe, Beall, Fagan, Minnich & McKee

[57] ABSTRACT

An optical recording and reproducing system has an optical recording and reproducing head driving arrangement including an optical pick-up and has an optical recording medium provided between the recording heads. The optical recording and reproducing head is mounted on a rotating arrangement. The head scans tracks while a relative position of the recording medium and rotating arrangement is changed. Each track has an address recorded at the beginning of scanning and a hold signal at the end of scanning. The recording and reproducing heads are separated one track. The recording head makes recording while the reproducing head makes reproduction. In the recording or reproducing mode of operation, the track address is looked. If wrong, it is corrected. The hold signal is detected to operate a tracking device and focusing device. Scanning the next track is determined by the address before tracking is made for recording or reproduction.

6 Claims, 8 Drawing Sheets

MAGNETIC OPTICAL RECORDING REVOLUTION

FIG. 10

OPTICAL RECORDING AND REPRODUCING SYSTEM

BACKGROUND OF THE INVENTION

1. Field of the Invention

The present invention relates to an optical recording and reproducing system. More particularly, it concerns an optical recording and reproducing system that can record and reproduce a large capacity of data.

2. Description of the Related Art

A prior optical recording and reproducing system having an optical recording and reproducing device arranged on one surface side of an optical recording medium and an magnetic recording and reproducing head arranged on the other surface side was put on the market. The prior system was disclosed was disclosed, for example, in an article entitled "Newly Developed Technologies for Audio Equipments", Association of Japan Television Engineering, Vol. 47, No. 6, pp. 841–844 (1993). The prior system has the magnetic optical recording and reproducing head arranged to record or reproduce a single continuous recording track on a rotating disc.

Also, the Japanese Patent Application Laid-Open No. 62-287428 disclosed an optical card recording and reproducing method having an optical card used as recording medium. In the prior method, an optical head is revolved to record on or reproduce from short arc-formed tracks of the optical card successively.

Further, the Japanese Patent Application Laid-Open No. 63-53726 disclosed an optical recording and reproducing system having a tape-formed optical recording medium and a rotating optical head. The prior system records on or reproduces from short arc-formed tracks of the tape successively.

Furthermore, the Japanese Patent Application Laid-Open No. 1-285024 disclosed system for recording and reproducing having a rotating cylinder including an optical head. The prior system records on or reproduces from short arc-formed or linear tracks of an optical tape successively while the optical tape is spirally wound on the rotating cylinder. However, the prior optical recording and reproducing system in the article "Newly Developed Technologies for Audio Equipments" does not take into account recording and reproducing a large capacity of data. To record and reproduce the large capacity of data, the rotating disc as recording medium has to be made larger or has to be increased in the number. Making largely the rotating disc needs a larger system that causes a problem of noises and vibration. Increasing the number of rotating discs causes a problem of interruption of signal when the rotating disc is put out and in. The prior art also has the disadvantage that it is hard to store the increased number of rotating discs if these record large capacity of data such as a high definition television signal in the future. Usual magnetic recording and reproducing systems such as video tape recorder have to be made to have as narrow a track as a few μm to record in high density. It is difficult to have such a narrow track as vibration is caused and the medium feeding speed is changed when the head is moved to scan.

The prior arts disclosed in The Japanese Patent Application Laid-Opens mentioned above do not take into account the high accuracy and reliability of focusing and tracking that are indispensable to secure continuity of a plurality of short tracks.

SUMMARY OF THE INVENTION

In view of solving the foregoing problems of the prior arts, particularly in recording and reproduction with use of the plurality of short recording tracks, it is an object of the present invention to provide an optical recording and reproducing system that can record and reproduce a large capacity of data.

Briefly, the foregoing object is accomplished in accordance with aspects of the present invention by an optical recording and reproducing system in the way that a laser beam irradiated from an optical pick-up is revolved to record or reproduce one or more almost semi-arc recording tracks on an optical recording and reproducing medium as an optical recording and reproducing head revolve one turn. The recording tracks are connected together successively to make a continuous recording track. The continuous recording track is used to record or reproduce data.

To connect the recording tracks to make the single continuous recording track, an optical pick-up is constructed so that the laser beam irradiated from a recording optical pick-up and the laser beam irradiated from a reproducing optical pick-up are separated one track. It is arranged that tracking adjustment can be made by the laser beam irradiated from the reproducing optical pick-up.

In tracking in an recording mode of operation, the signal recorded in the preceding scanning is reproduced by the reproducing optical pick-up to make tracking for scanning. The recording optical pick-up records in a track next to the preceding recorded track as the recording optical pick-up scans one track prior to the reproducing optical pick-up.

In an recording mode of operation, the reproducing optical pick-up reproduce the signal without the above-described recording.

To connect the recording tracks smoothly to make the single continuous recording track, a control signal is recorded at a beginning and an end of each recording track. The control signal A of the recording track has a track address recorded therein to check for wrong scanning track to make scanning of right track. The control signal B of the recording track informs that the recording track ends so that tracking and focusing can be held until the beginning of the recording track. This optimizes movement of the optical recording and reproducing head, thereby preventing transient behaviors of tracking and focusing.

The optical recording medium does not have to have a specific tracking signal recorded thereon in advance. In addition, the optical recording medium can record in narrow tracks as track intervals can be servo-controlled even in the recording mode of operation.

If an image signal is recorded as data, the system of the present invention can secure an optimum image depending on a search speed as the control signal recorded at the beginning of the track can be used to determine the track to be scanned in the high-speed search.

DESCRIPTION OF THE PREFERRED EMBODIMENT

Figure 1:
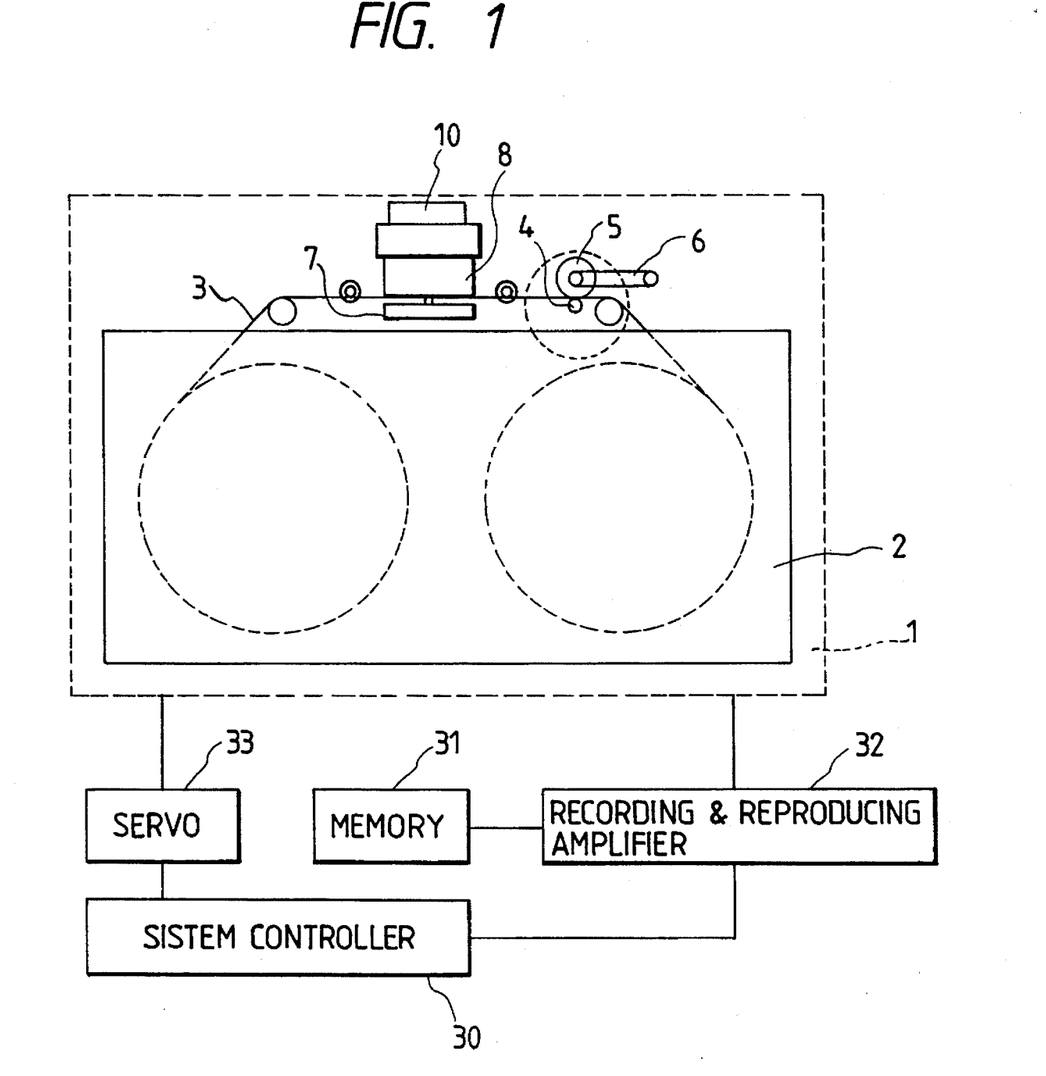
FIG. 1 is a plan view illustrating the embodiment of a magnetic optical recording and reproducing system according to the present invention.
Figure 2:
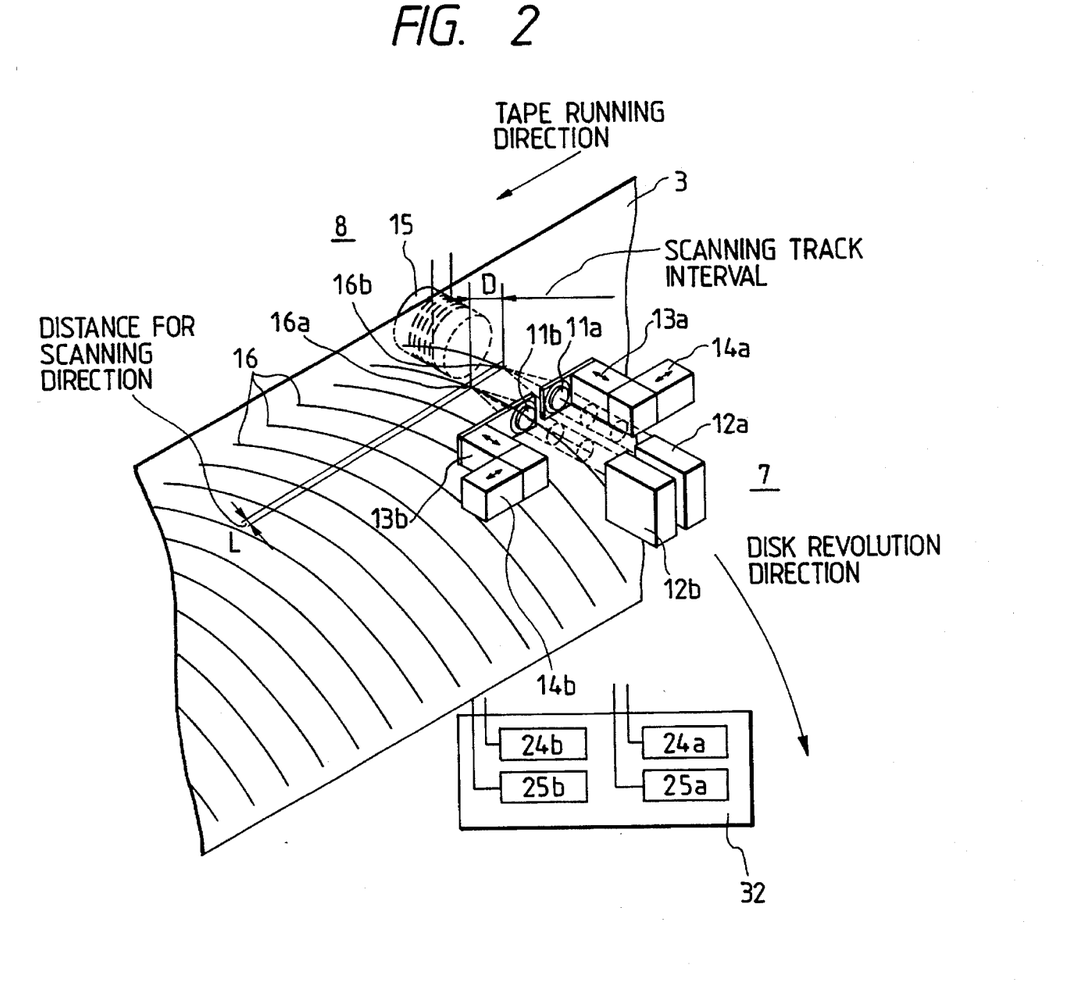
FIG. 2 is a perspective view illustrating structure of the magnetic optical recording arrangement of the magnetic optical recording and reproducing system in the embodiment.
Figure 3:
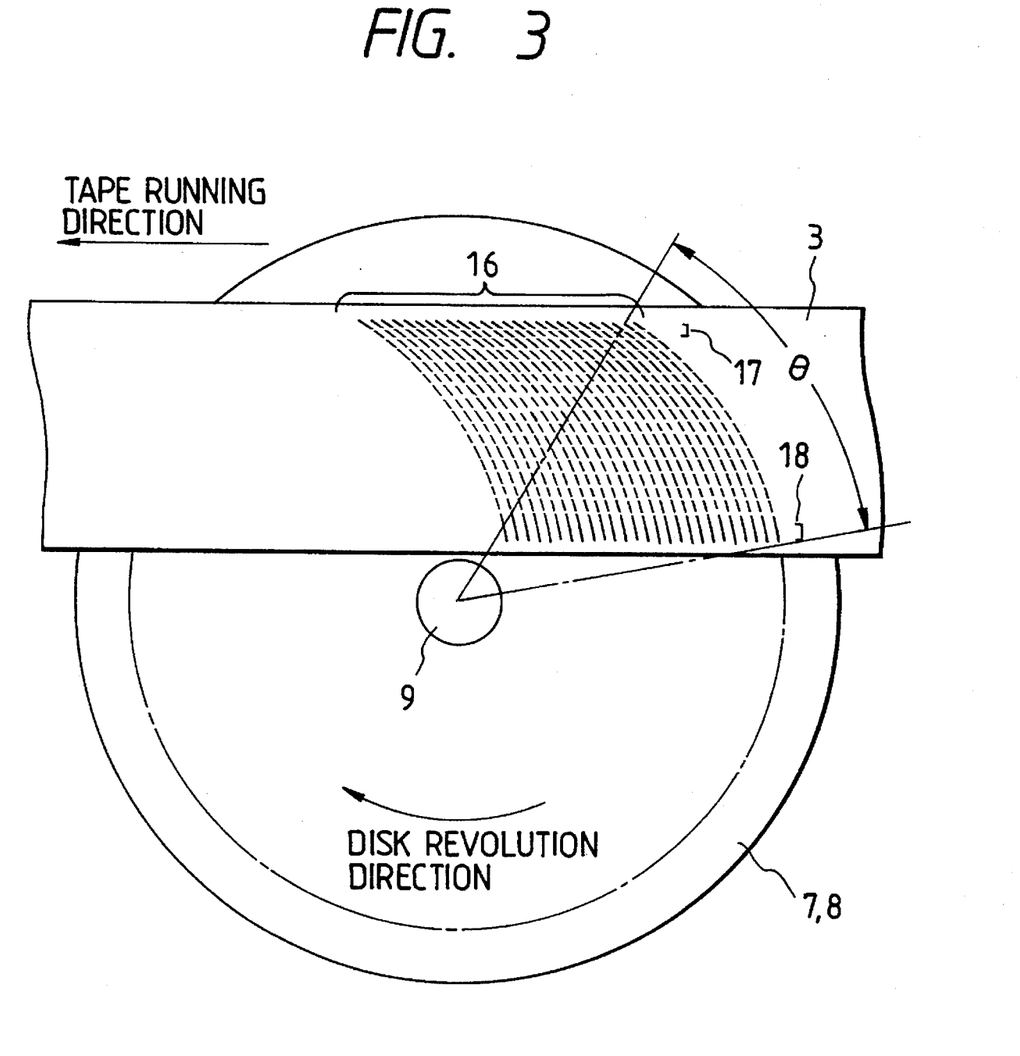
FIG. 3 is a detailed view illustrating the track recorded on the magnetic optical tape by the first embodiment.

The following describes in detail a first embodiment according to the present invention by reference to FIGS. 1 to 3 of the accompanying drawings.

FIG. 1 depicts a plan view illustrating the embodiment of a magnetic optical recording and reproducing system 1 according to the present invention. The magnetic optical recording and reproducing system 1 has a cassette 2, a magnetic optical tape 3, a capstan 4, a pinch roller 5, and a pinch roller arm 6 as shown. The capstan 4 and the pinch roller 5 pinches the magnetic optical tape 3 to run. The pinch roller arm 6 presses the pinch roller 5 to the capstan 4. The magnetic optical recording and reproducing system 1 also has rotating discs 7 and 8 having a magnetic optical recording arrangement installed thereon. The rotating discs 7 and 8 are actuated by a drum motor 10 to rotate around a revolution axis 9 to scan the magnetic optical tape 3.

In the figure also are indicated a system controller 30 for controlling recording and reproduction, a memory 31, a recording and reproducing amplifier 32, and a servo arrangement 33 for driving a recording and reproducing actuator.

FIG. 2 depicts a perspective view illustrating structure of the magnetic optical recording arrangement of the magnetic optical recording and reproducing system 1 in the embodiment.

The rotating disc 7 has object lenses 11a and 11b, optical pick-ups 12a and 12b, piezoelectric devices 13a and 13b for focus adjustment for positioning revolution axis directions of the object lenses 11a and 11b, and focus adjusting circuits 24a and 24b mounted thereon. The rotating disc 7 also has piezoelectric devices 14a and 14b for track adjustment for positioning scanning directions of the object lenses 11a and 11b and track adjusting circuits 25a and 25b for driving the piezoelectric devices 14a and 14b for track adjustment mounted thereon.

The rotating disc 8 has a recording head 15 positioned thereon to face a laser beam irradiated from the recording optical pick-up 12a onto the magnetic optical tape 3. The recording head 15 can record onto or reproduce from the magnetic optical tape 3 a signal in the magnetic optical recording method. If the laser bean is made out of a width of the magnetic optical tape 3 as the rotating disc 7 rotates, the recording or reproduction is stopped. In other words, only if the rotating disc 7 is in a specific range of revolution angle, the recording or reproduction can be made.

If recording is made on a recording track 16 of the magnetic optical tape 3, the recording optical pick-up 12a irradiates a heating laser beam. The object lens 11a focuses the laser beam to the magnetic optical tape 3. When the magnetic optical tape 3 is heated, a magnetic polarity can be easily changed from S to N and vice versa. Accordingly, the laser beam is irradiated onto an upper surface of the magnetic optical tape 3 to heat to make easy the change of the magnetic polarity S to N or N or S. Then, the recording head 15 applies a magnetic field to a lower surface of the magnetic optical tape 3 to magnetize the magnetic optical tape 3 to S or N according to the information of an image to be recorded. If a temperature of the magnetic optical tape 3 decreases, the magnetic polarity is remained, or recorded on the magnetic optical tape 3, as it was.

On the other hand, in the reproduction mode of operation, the reproducing optical pick-up 12b irradiates through the 11b a reading laser beam from the reproducing optical pick-up 12b to the magnetized magnetic optical tape 3. The tracking adjusting circuit 25b and the focus adjusting circuit 24b adjust the 13b to focus the laser beam to the recording track 16 of the magnetic optical tape 3 to read S or N by difference of a reflection state of the laser beam. The magnetic polarity S or N is converted to a digital signal 0 or 1 to reproduce a digital data.

The track adjusting circuits 25a and 25b pre-adjust the laser beam irradiated from the recording optical pick-up 12a and the laser beam irradiated from the reproducing optical pick-up 12b on the surface of the magnetic optical tape 3 to focus with some offset so that the laser beams should have an interval L of one scanning track therebetween.

In the reproduction mode of operation, the first recording track is properly positioned by a scanning arrangement of the system. The second and following recording tracks 16a are positioned in a way that the reproduction optical pick-up 12b picks up the track 16a recorded in the preceding scanning. That is, tracking the focus of the laser beam irradiated from the recording optical pick-up 12a on the magnetic optical tape 3 is made after one scanning by the reproduction optical pick-up 12b so that the irradiation can be made on the next recording track 16b sequentially and securely.

FIG. 3 depicts a detailed view illustrating the tracks 16 recorded on the magnetic optical tape 3 by the first embodiment.

A recordable range of a single recording track 16 is 45° to 60° of revolution angle θ of the rotating disc. As the tape is moved in an arrow direction in the recording mode of operation, each of the tracks is drawn in a locus close an arc.

Figure 4:
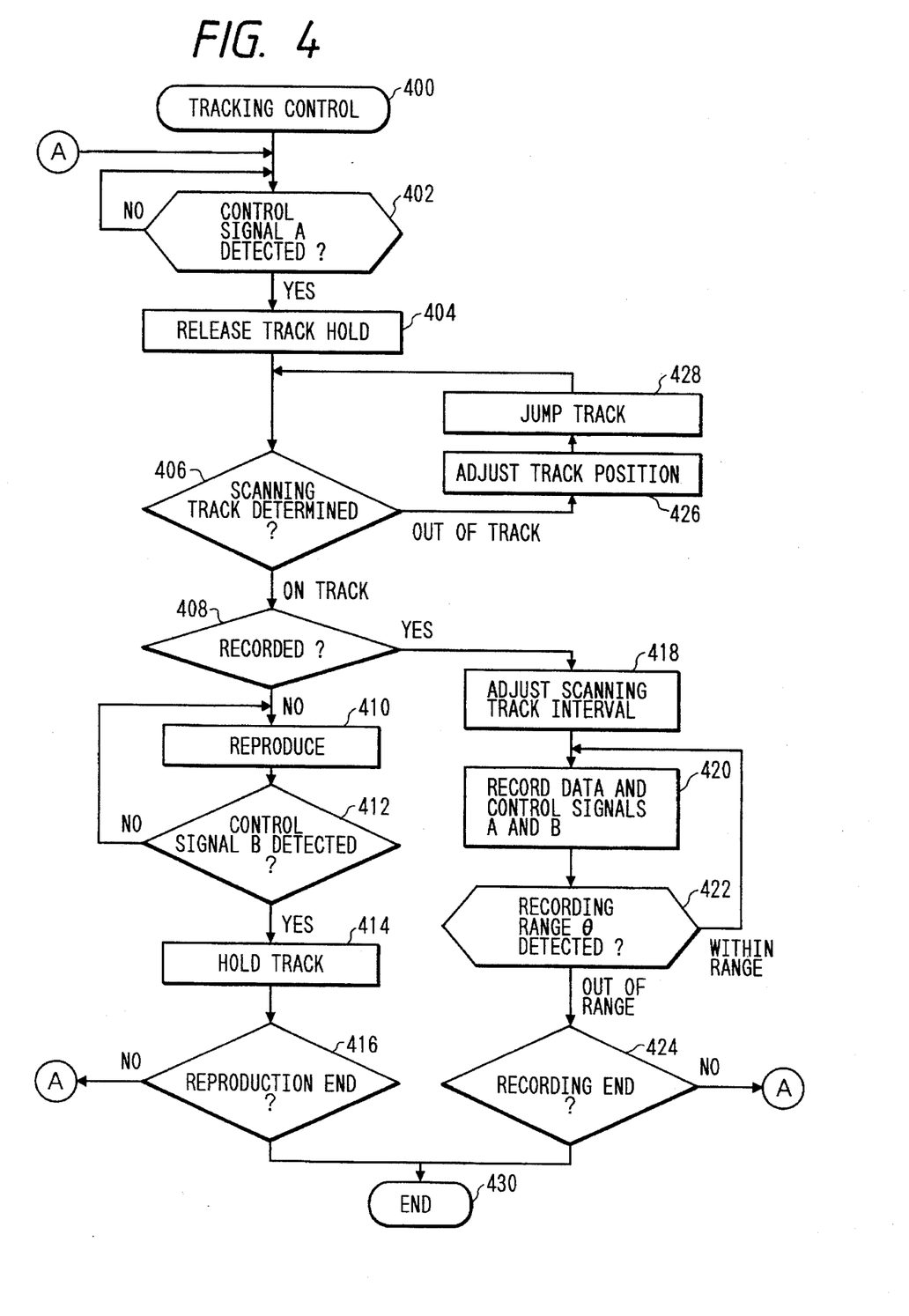
FIG. 4 is a flow diagram illustrating the tracking control process of the present invention.

The system controller 30 adjusts the tracks and focuses of the optical pick-ups. FIG. 4 depicts a flow diagram illustrating an operation for adjusting the tracks of the optical pick-ups.

In reproduction, the control signal A representing scanning start is detected first (step 402). When the control signal A is detected, holding the track is released (step 404). In turn, the scanning track 16 is determined (step 406). If right, step 408 and the following reproducing or recording process are carried on. In the recording process, position of the recording track 16a is adjusted to deviate one scanning track from that of the preceding recorded track (step 418). In turn, the control signals A and B for data and current track are recorded (step 420). The recording is repeated until an angle detected by angle encoder or the like becomes a predetermined angle θ. In reproduction, on the other hand, reproduction is repeated until the control signal B is detected (steps 410 to 412). If the control signal B is detected, the track is held (step 416) before the track adjustment of the optical pick-ups ends.

If the scanning track is wrong, the piezoelectric devices 14a and 14b for track adjustment are actuated by the track adjusting circuits 25a and 25b to adjust the tracks (steps 434 and 436). Then, the reproducing or recording process described above is carried on.

Figure 5:
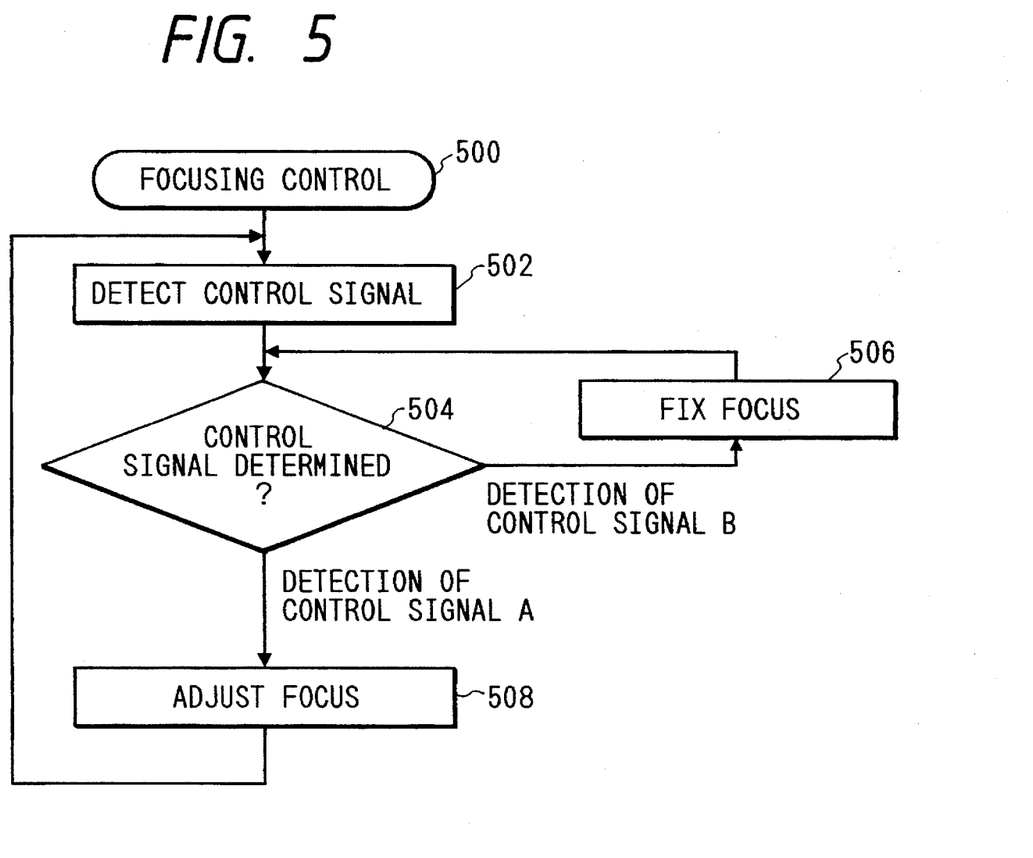
FIG. 5 is a flow diagram illustrating the focus control process of the present invention.

In turn, the following describes a focusing process by reference to FIG. 5. First, the control signals A and B are detected (step 502). The control signals are identified (step 504). If the control signal B is detected, the focus is fixed (step 506). This is made by fixing voltages output of the track adjusting circuits 25a and 25b to hold the piezoelectric devices 13a and 13b for focus adjustment and the piezoelectric devices 14a and 14b for track adjustment.

On the contrary, if the control signal A is detected at step 504, the track adjusting circuits 25a and 25b are actuated to adjust the focuses (step 508).

There is provided a distance L for scanning direction between the position of the focus of the laser beam from the reproduction optical pick-up 12b on the surface of the magnetic optical tape 3 and the position of the focus of the laser beam from the recording optical pick-up 12a on the magnetic optical tape 3 (see FIG. 2). This holds the position of the focus of the laser beam irradiated from the recording optical pick-up 12a on the piezoelectric device 13 for focus adjustment in a time difference ΔT for the distance L when the reproducing optical pick-up 12b reproduces the hold signal of the end control signal B 18. Such a feature can act against sudden change of the focus position when the scanning position of the laser beam is moved out of the surface of the magnetic optical tape 3 with rotation of the rotating disc. The feature further can shorten the refocusing time to a great extent after the laser beam re-scans the surface of the magnetic optical tape 3 when the rotating disc restarts revolution.

When the laser beam is returned to the magnetic optical tape 3 with the revolution, the reproducing optical pick-up 12b detects the control signal A 17 to release the hold. If the scanning address of the reproducing optical pick-up 12b is right, the reproduction is continued as it is. If the scanning address is wrong, the scanning position is adjusted before the reproduction is restarted.

In the recording mode of operation, the recording is restarted in the time difference ΔT. The reproduced signal is used as a tracking signal for recording. With the time difference ΔT, recording is not made while after wrong track scanning, correction is made for right track scanning. Even when recording is made after the correction, the recording track 16 can have recording rightly as is the case with the preceding recording track 16.

Figure 6:
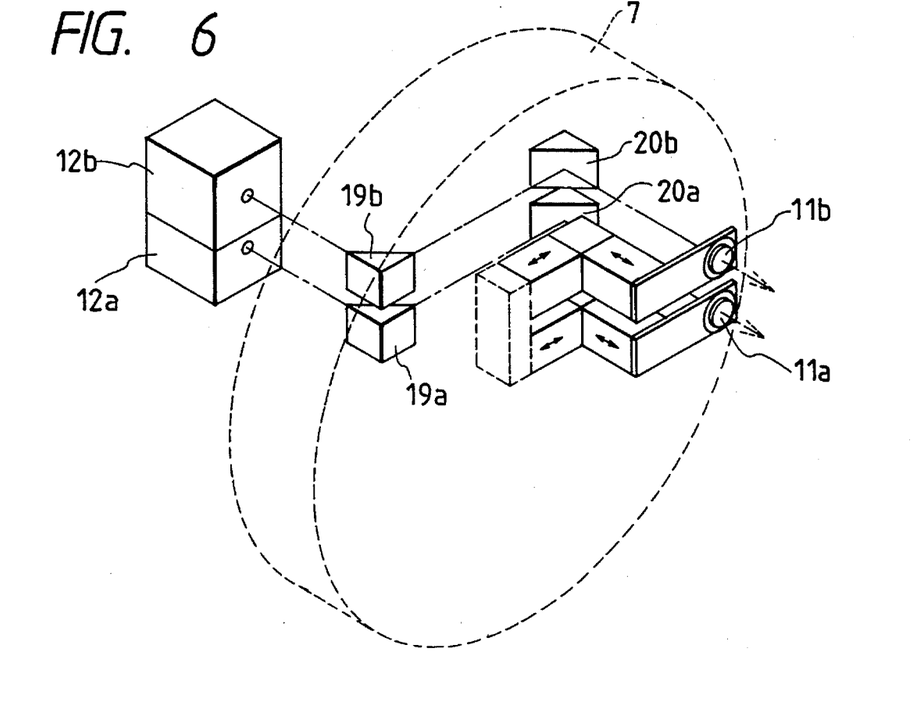
FIG. 6 is a perspective view illustrating a second embodiment of the present invention in which the optical pick-ups are fixed.

FIG. 6 depicts a perspective view illustrating a second embodiment of the present invention in which the mounting construction of the optical pick-ups 12a and 12b is changed. The second embodiment is constructed as follows. The optical pick-ups 12a and 12b are mounted on a chassis (not shown). The laser beams irradiated from the optical pick-ups 12a and 12b are reflected by first mirrors 19a and 19b arranged around the revolution axis of the rotating disc 7. The laser beams irradiated reflected by the first mirrors 19a and 19b are further reflected to the object lenses 11a and 11b by second mirrors 20a and 20b arranged on the object lenses 11a and 11b. Since the rotating disc 7 does not have the optical pick-ups 12a and 12b mounted thereon, the rotating disc 7 can be made small and light.

Figure 7:
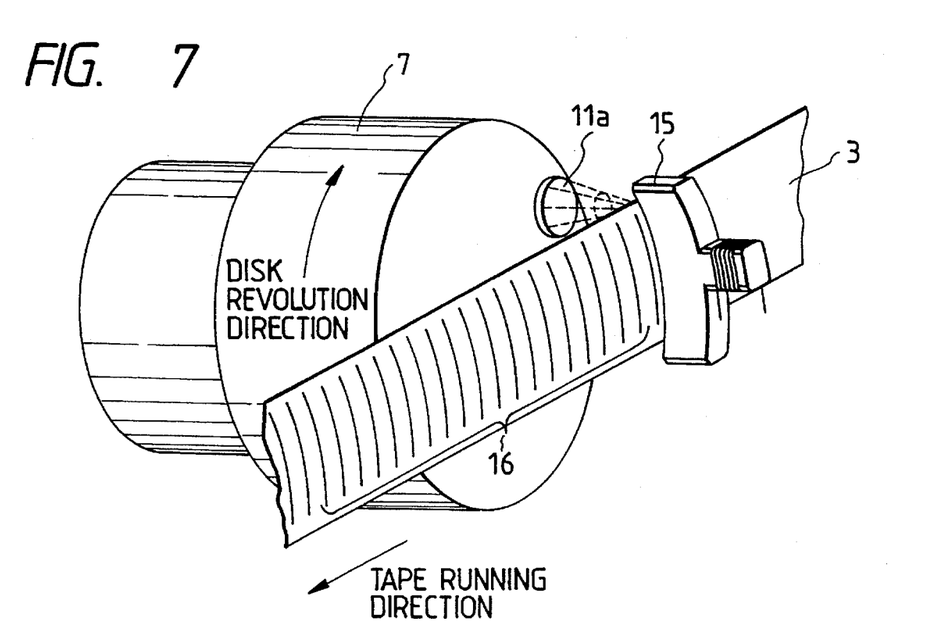
FIG. 7 is a perspective view illustrating a third embodiment of the present invention that has the recording head fixed.

FIG. 7 depicts a perspective view illustrating a third embodiment of the present invention that has the recording head 15 fixed.

The recording head 15 is provided to record data on the recording track 16. The recording head 15 has an arc-like recording surface to fit with the shape of the recording track 16. With the recording head 15 fixed, a speed of the magnetic optical tape 3 relative to the recording head 15 is the running speed of the magnetic optical tape 3. The magnetic optical tape 3 therefore can be run in contact with the recording head 15.

Since the rotating disc 7 can be positioned on a single side of the magnetic optical tape 3 to revolve for scanning, the third embodiment does not need the revolution axis 9 that is in the same revolution axis as that of the rotating disc 7 to revolve the recording head 15. The recordable range of a single recording track 16 can be extended. That is, since the position of the magnetic optical tape 3 is not restricted for the rotating disc by the revolution axis, the recordable range (revolution angle θ) of the recording track 16 can be extended to around 90° to 120°. As a result, number of tracks needed to record the data of the same amount can be reduced so that numbers of the control signals A and B can be reduced. This can decrease control error. Also, diameter of the rotating disc 7 can be made small as the recordable range θ is made wide and the turning range of the object lens 11a for the magnetic optical tape 3 is made small. This can make the system small.

Figure 8:
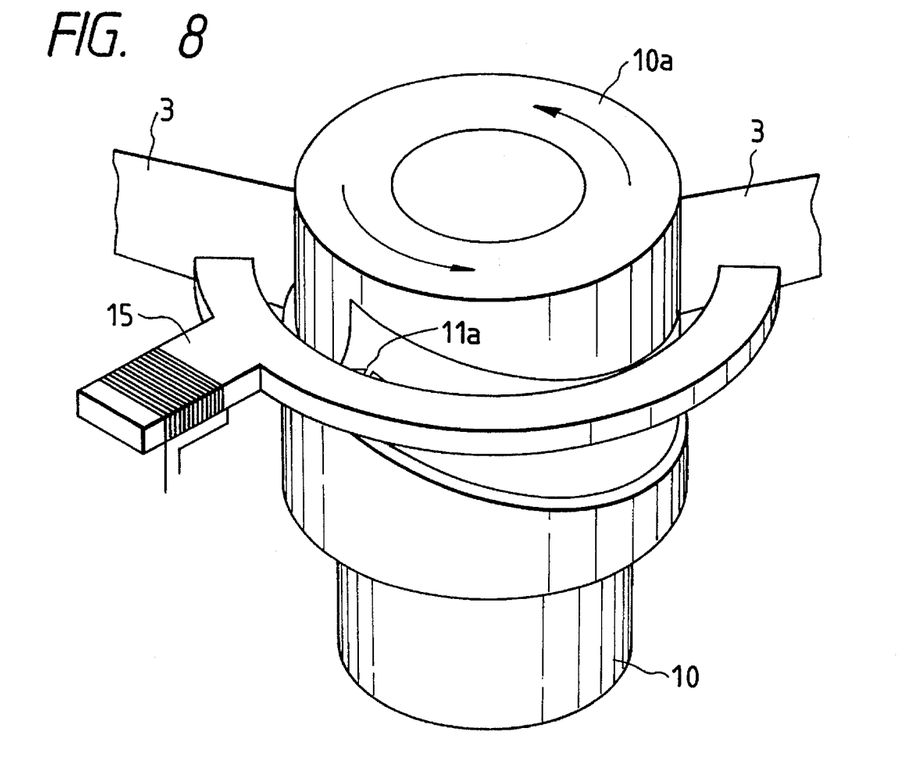
FIG. 8 is a perspective view illustrating a helical scanning fashion of the magnetic optical recording and reproducing section shown in FIG. 7.

FIG. 8 depicts a perspective view illustrating a helical scanning fashion of the magnetic optical recording and reproducing section shown in FIG. 7. The object lens 11a is mounted on a drum 10a driven by the drum motor 10. The recording head 15 is shaped semi-circular. The fashion can make longer the recording track 16 for unit scanning. This can reduce rates of the start control signal A 17 and the end control signal B 18 for unit scanning. Also, the fashion can make linear by the recording track 16 so that the track intervals can be made equal. Further, the fashion can make the tape running direction close to the laser beam scanning angle. This can make greater allowance for tracking error due to change of the tape running.

The optical recording used in the embodiments described above is of magnetic optical recording method of the magnetic field modulation. For a phase change or optical intensity modulation to make the optical recording, recording can be made only by the optical pick-ups without the recording head used in the embodiments.

Figure 9:
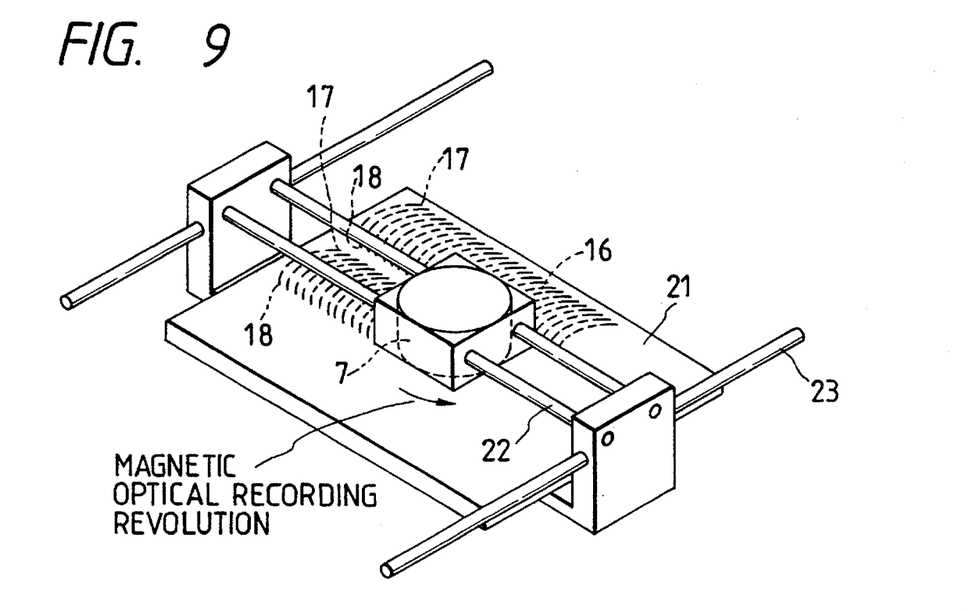
FIG. 9 is a perspective view illustrating a fourth embodiment of the present invention that uses a magnetic optical card as recording medium.

FIG. 9 depicts a perspective view illustrating a fourth embodiment of the present invention that uses a magnetic optical card 21 as recording medium. The fourth embodiment uses the magnetic optical card 21 instead of the magnetic optical tape S in the embodiments shown in FIGS. 1 through 8. The fourth embodiment is constructed identically as the previous ones except for additional X-axis linear scale 22 and Y-axis linear scale 23 for driving an optical recording and reproducing section on the magnetic optical card 21. The recording head 15 (not shown) is arranged to revolve for scanning from a rear surface faced with the irradiation surface of the laser beam of the optical pick-up on the recording side of the magnetic optical card 21. Alternatively, the recording head 15 may be fixed.

The system in the fourth embodiment having the magnetic optical card 21 to record on a whole surface thereof can be made smaller than the one having a recording disc.

Figure 10:
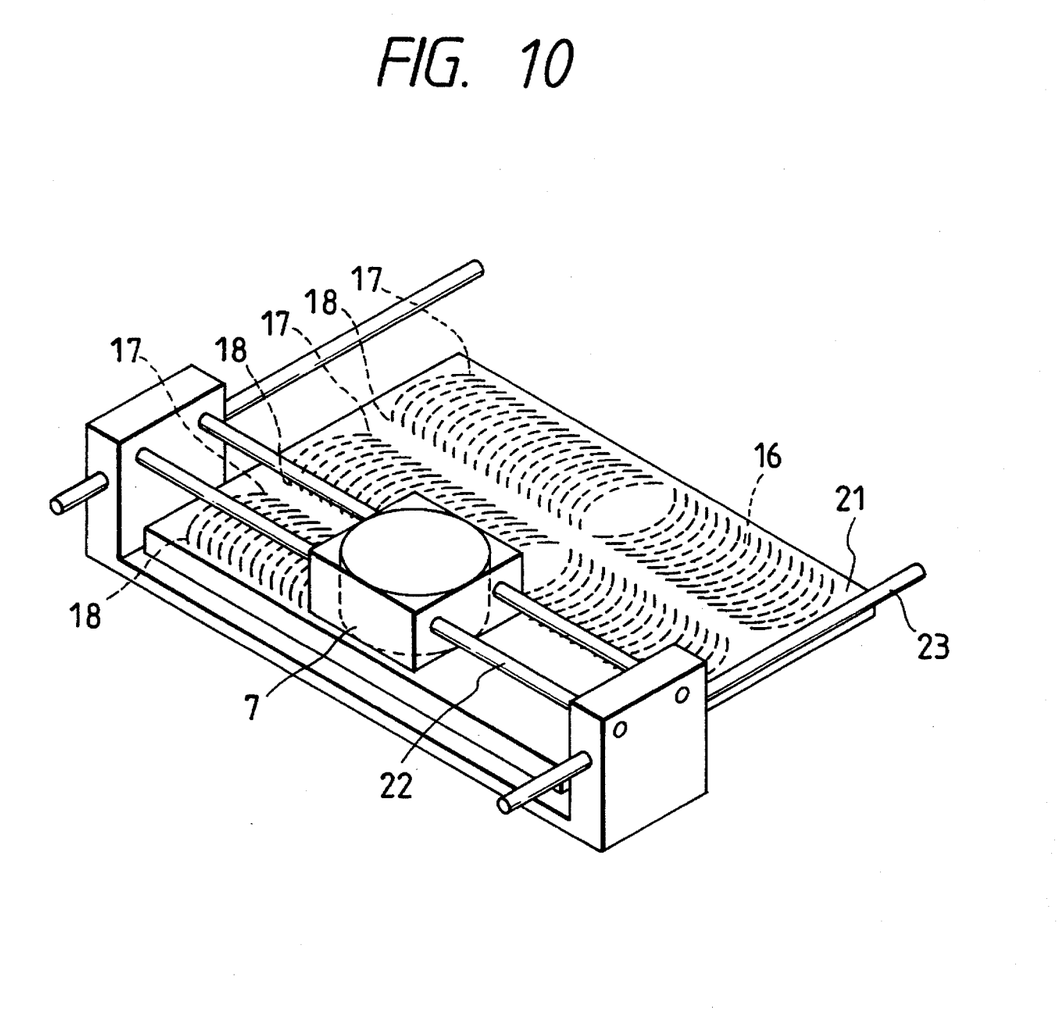
FIG. 10 is a perspective view illustrating a variation of the recording track on the magnetic optical card.

FIG. 10 depicts a perspective view illustrating a variation of the recording track 16 on the magnetic optical card 21. The recording tracks 16, as shown in FIG. 10, are longitudinally concaved on central portions thereof and symmetrically to both edges, while the ones in FIG. 9 is made of the single arc-drawn pattern. Such a recording way allows recording on the whole surface of the magnetic optical card 21 even if the moving distance of the rotating disc 7 in an X direction is made short.

The magnetic optical recording section shown in FIGS. 9 and 10 are moved on an X-axis and Y-axis linear scales on the magnetic optical card 21. Alternatively, the magnetic optical card 21 may be moved in either of the directions or in the both directions.

As described so far, the optical recording and reproducing system of the present invention can stably record and reproduce narrower track than a few μm. The optical recording and reproducing system also can be used for optical recording media of desired shapes such as tape and card. Hence, the optical recording and reproducing system can increase the recording capacity of the recording medium per unit volume to a great extent.

What is claimed is:

1. An optical recording and reproducing system having an optical recording and reproducing head unit for optical recording and reproducing by scanning one side of an optical recording medium by a laser beam irradiated from an optical pick-up through a pair of objective lenses, and a rotating arrangement for supporting at least said objective lenses in said optical recording and reproducing head unit, said optical recording medium having a recording surface having a plurality of discontinuous tracks, the optical recording and reproducing head unit recording or reproducing on at least one track on the optical recording medium with use of a head position control signal while the rotating arrangement revolves one turn, by phase control of said rotating arrangement wherein said optical recording and reproducing head unit comprises:
a driving means for changing a relative position of said objective lenses on said rotating arrangement, and
a control means for i) recording a track control signal giving data of each of track numbers and a scanning start and a scanning end of the track on the optical recording medium, and for ii) recording on and reproducing from said plurality of tracks on said optical recording medium as a single continuous recording track with use of said track control signal and said head position control signal, by sequentially controlling the position of said objective lenses at the scanning start point of the next track using said driving means.

2. The optical recording and reproducing system according to claim 1 wherein the optical recording medium is a band magnetic optical tape having a continuous recording surface for recording said plurality of discontinuous tracks.

3. The optical recording and reproducing system according to claim 2 wherein the tracks are arc-formed.

4. The optical recording and reproducing system according to claim 1 wherein the optical recording medium is a rectangular magnetic optical card having a plurality of recording surfaces for recording said plurality of discontinuous tracks.

5. The optical recording and reproducing system according to claim 4 wherein the tracks are arc-formed.

6. An optical recording and reproducing method in an optical recording and reproducing system having an optical recording and reproducing head unit including an optical pick-up arranged on one side of an optical recording medium for optical recording and reproducing by scanning the optical recording medium by a laser beam irradiated from the optical pick-up through a pair of objective lenses, and a rotating arrangement for supporting the optical pick-up and said objective lenses, said optical recording and reproducing head unit making recording and reproducing on said optical recording medium by phase control using said rotating arrangement with use of a head position control signal wherein the method comprises the steps of:

using a band optical recording medium having a recording surface for recording a plurality of discontinuous tracks as said optical recording medium, recording at least one track on said band optical recording medium while the rotating arrangement revolves one turn, recording a track control signal for controlling the position of said optical recording and reproducing head unit including data on a beginning and end of the track and a track number for each of said plurality of tracks on said band optical recording medium, and recording and reproducing said plurality of tracks as a single continuous recording track by changing the relative position of said objective lenses on said rotating arrangement by a driving means using said track control signal and said head position control signal and performing phase control using said rotating arrangement.

* * * * *